United States Patent
Enke et al.

(10) Patent No.: US 10,577,121 B2
(45) Date of Patent: Mar. 3, 2020

(54) DETECTION AND SIGNALING OF CONDITIONS OF AN UNMANNED AERIAL VEHICLE

(71) Applicant: GoPro, Inc., San Mateo, CA (US)

(72) Inventors: Joseph A. Enke, Campbell, CA (US); Miles Hansen, Redwood City, CA (US); Mehran Ferdowsi, Foster City, CA (US)

(73) Assignee: GoPro, Inc., San Mateo, CA (US)

( * ) Notice: Subject to any disclaimer, the term of this patent is extended or adjusted under 35 U.S.C. 154(b) by 251 days.

(21) Appl. No.: 15/834,158

(22) Filed: Dec. 7, 2017

(65) Prior Publication Data
US 2019/0177002 A1 Jun. 13, 2019

(51) Int. Cl.
*B64D 45/00* (2006.01)
*B64C 39/02* (2006.01)
*G05D 1/00* (2006.01)

(52) U.S. Cl.
CPC .......... *B64D 45/00* (2013.01); *B64C 39/024* (2013.01); *G05D 1/0055* (2013.01)

(58) Field of Classification Search
CPC .... B64D 45/00; B64D 39/024; G05D 1/0055; G07C 5/08
USPC .......................................................... 701/14
See application file for complete search history.

(56) References Cited

U.S. PATENT DOCUMENTS

| | | | |
|---|---|---|---|
| 9,359,067 B2 * | 6/2016 | Fucke | B64C 19/00 |
| 9,743,202 B2 * | 8/2017 | Orman | G01S 3/8022 |
| 2008/0239874 A1 | 10/2008 | Kemp | |
| 2016/0327956 A1 * | 11/2016 | Zhang | B64C 39/024 |
| 2018/0032308 A1 * | 2/2018 | Lan | G05B 19/042 |
| 2018/0150073 A1 * | 5/2018 | Lee | B64D 45/00 |

FOREIGN PATENT DOCUMENTS

| | | |
|---|---|---|
| RU | 2221276 C2 | 1/2004 |
| RU | 68145 U1 | 11/2007 |
| RU | 2007117685 A | 11/2008 |
| RU | 2634470 C2 | 9/2015 |

OTHER PUBLICATIONS

International Search Report for Appl. No. PCT/US2018/062613, dated Mar. 28, 2019, 9 pages.

\* cited by examiner

*Primary Examiner* — Thomas G Black
*Assistant Examiner* — Luat T Huynh
(74) *Attorney, Agent, or Firm* — Young Basile Hanlon & MacFarlane, P.C.

(57) ABSTRACT

A condition of an unmanned aerial vehicle (UAV) is detected using one or more sensors of the UAV and signaled according to an alert definition associated with the condition. For example, an alert definition can indicate to signal the condition by using a motor of the UAV to produce an audible tone. A tonal signal having a frequency within an audible spectrum can be generated according to the alert definition. The tonal signal and a drive signal used for supplying current to the motor can be combined to produce a combined signal. The combined signal can then be transmitted to the motor to cause the motor to produce the audible tone. In some cases, an amplitude of the tonal signal can be modulated, such as where the amplitude of the combined signal exceeds a threshold associated with an operating margin of the UAV.

20 Claims, 7 Drawing Sheets

DETECTION AND SIGNALING OF CONDITIONS OF AN UNMANNED AERIAL VEHICLE

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates to the detection and signaling of conditions of an unmanned aerial vehicle (UAV).

BACKGROUND

UAVs may be used for commercial and recreational purposes. For example, a user may operate a UAV to capture photographs from higher altitudes than the user can reach by himself or herself. In another example, a user may operate a UAV to control the delivery of a good, such as to a purchaser. The UAV may include sensors to measure operational aspects of the UAV, for example, a flight altitude, an operating temperature, a rate of acceleration, or the like. These operational aspects can indicate whether the UAV is functioning as intended.

SUMMARY

Systems and techniques for detection and signaling of conditions of a UAV are described below.

One aspect of the disclosure is a method for detecting and signaling a condition of an unmanned aerial vehicle. The method includes detecting the condition using one or more sensors of the unmanned aerial vehicle. The method further includes identifying an alert definition associated with the condition. The alert definition specifies an audible tone for signaling the condition. The method further includes generating an alert according to the alert definition. The alert includes a tonal signal having a frequency within an audible spectrum. The method further includes combining the tonal signal and a drive signal to produce a combined signal. The drive signal supplies current to a motor of the unmanned aerial vehicle. The method further includes signaling the condition by causing the motor to produce the audible tone using the combined signal.

Another aspect of the disclosure is a UAV. The UAV includes a detection system including one or more sensors for detecting a condition of the unmanned aerial vehicle. The UAV further includes a motor controller including a tonal control mechanism and a signal mixer. The tonal control mechanism generates a tonal signal subsequent to receiving data associated with the condition from the detection system. The signal mixer produces a combined signal by combining the tonal signal and a drive signal. The UAV further includes a motor that produces an audible tone using the combined signal subsequent to receiving the combined signal from the motor controller.

Another aspect of the disclosure is a non-transitory computer-readable storage medium, comprising processor-executable routines that, when executed by a processor, facilitate a performance of operations at a UAV. The operations include combining a first amplitude corresponding to a frequency of a tonal signal and a second amplitude corresponding to a frequency of a drive signal to produce a combined amplitude. The operations further include determining that the combined amplitude exceeds an amplitude threshold. The operations further include, responsive to determining that the combined amplitude exceeds the amplitude threshold, reducing the first amplitude. The operations further include, subsequent to reducing the first amplitude, combining the tonal signal and the drive signal to produce a combined signal. The operations further include causing a motor of the unmanned aerial vehicle to produce an audible tone using the combined signal.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

BRIEF DESCRIPTION OF THE DRAWINGS

The disclosed implementations have other advantages and features that will be more readily apparent from the detailed description, the appended claims, and the accompanying figures. A brief introduction of the figures is below.

Figure 1A:
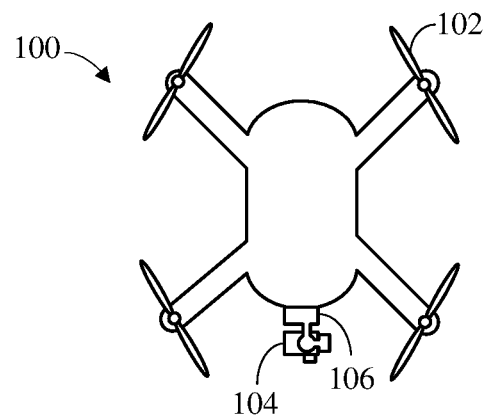
FIG. 1A shows an example of a UAV.

All figures disclosed herein are © Copyright 2017 GoPro Inc. All rights reserved.

DETAILED DESCRIPTION

A UAV may experience an issue related to its ability to operate at full capacity. For example, the battery or other power source of the UAV may approach a nearly depleted state, a connection between the UAV and a controller of the UAV may be interrupted, or the like. In an extreme example, a component of the UAV may malfunction, such as to cause the UAV to enter a free-fall state. Sensors of the UAV may be able to detect that such an issue is occurring, such as by measuring the UAV the environment in which the UAV is operating, or both.

In some cases, the occurrence of the issue may be apparent to a user of the UAV or persons nearby the UAV during operation. However, in other cases it may not be apparent. For example, when a UAV enters a free-fall state, the UAV is silent. A person not watching the UAV fall through the air may not notice that the UAV is falling until it strikes the ground or floor below it. There is therefore a risk of injury to persons standing underneath a UAV that has entered a free-fall state. One solution may be to include a dedicated audible feedback system, such as a speaker or amplifier and supporting circuitry, within the UAV. The dedicated audible feedback system may be configured to make a loud noise when the UAV has entered a free-fall state to alert nearby persons.

However, the inclusion of a dedicated audible feedback system within a UAV presents several challenges. For example, the components used to implement such a system would require physical space within the UAV, which is already a tightly packed, carefully structured device. In another example, such a system would require consume power resources otherwise available for flying the UAV, thereby reducing the time the UAV is in use. In yet another example, the components used to implement such a system may be expensive and could make the UAV cost prohibitive to some consumers.

Implementations of this disclosure address problems such as these by detected a condition of a UAV using one or more sensors of the UAV and signaling the condition according to an alert definition associated with the condition. The condition can reflect a failure or other malfunction of some or all components of the UAV, a low power warning for the battery or other power source of the UAV, an altitude at which the UAV is flying, or the like. The alert definition indicates a manner by which to signal the condition based on the specific type of condition. An output is produced according to the alert definition to signal the condition.

For example, sensors of a UAV can detect that the UAV has entered a free-fall state or that some other condition exists with respect to the UAV. An alert definition can indicate to signal the condition by using a motor of the UAV to produce an audible tone. A tonal signal having a frequency within an audible spectrum can be generated according to the alert definition. The tonal signal and a drive signal used for supplying current to the motor can be combined to produce a combined signal. The combined signal can then be transmitted to the motor to cause the motor to produce the audible tone. The audible tone is output from the UAV to signal the condition of the UAV, such as to a user of the UAV or persons nearby the UAV.

The implementations of this disclosure will now be described in detail with reference to the drawings that are provided as illustrative examples to enable those skilled in the art to practice the technology. The figures and examples below are not meant to limit the scope of this disclosure to a single implementation, but other implementations are possible by way of interchange of or combination with some or all of the described or illustrated elements. Wherever convenient, the same reference numbers will be used throughout the drawings to refer to same or like parts.

FIG. 1A shows an example of a UAV 100. In this implementation, the UAV 100 has a quad-copter configuration, that is, the UAV 100 includes four rotors 102. Each rotor 102 is driven by a separate electric motor (not shown). However, the UAV 100 may be any form of an aerial vehicle.

A battery pack (not shown) mounted on or in a body of the UAV 100 may supply electrical power to all four electric motors, flight electronics (not shown) associated with operation of UAV 100, and an imaging device 104 that provides still and video images by means of a communication link (not shown) to a ground-based user. The imaging device 104 may be coupled to a front of the UAV 100 using, for example, a movement mechanism 106.

In FIG. 1A, the movement mechanism 106 removably mounts the imaging device 104 to the UAV 100. The implementation of the movement mechanism 106 shown in this example is a three-axis gimbal that permits the imaging device 104 to be rotated about three independent axes. However, the movement mechanism 106 may include any type of translational and/or rotational elements that permit rotational and/or translational movement in one, two, or three dimensions of the imaging device 104 in respect to the UAV 100.

Figure 1B:
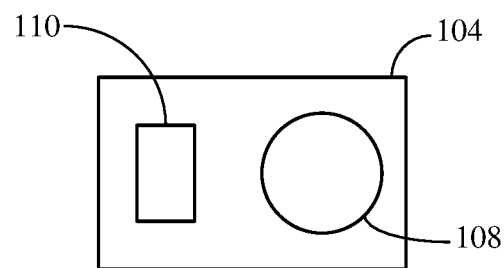
FIG. 1B shows an example of the imaging device associated with the UAV.

FIG. 1B shows an example of the imaging device 104 associated with the UAV 100. In FIG. 1B, the imaging device 104 is a GoPro Hero4® or Hero5® camera, however any type of imaging device 104 that can be coupled to the UAV 100, for example, through use of the movement mechanism 106, may be utilized. The imaging device 104 may include still image and video capture capabilities. FIG. 1B shows a lens 108 of the imaging device 104 and a display screen 110 associated with the imaging device 104. Means for coupling the imaging device 104 to the UAV 100 and/or the movement mechanism 106 are not shown.

Figure 1C:
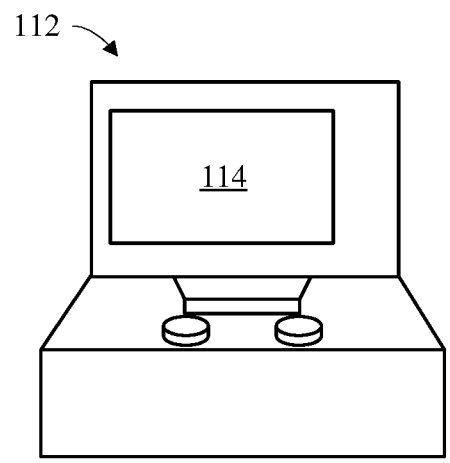
FIG. 1C shows an example of a remote controller and user interface for the UAV.

FIG. 1C shows an example of a remote controller 112 including a user interface 114 for operating the UAV 100. The remote controller 112 may include a communications interface (not shown) via which the remote controller 112 may receive and send commands related to operation of the UAV 100, the imaging device 104, and the movement mechanism 106. The commands can include movement commands, configuration commands, operational control commands, and imaging commands. In some implementations, the remote controller 112 may be a smartphone, a tablet computer, a phablet, a smart watch, a portable computer, and/or another device configured to receive user input and communicate information with the imaging device 104, the movement mechanism 106, and/or the UAV 100.

For example, flight direction, attitude, and altitude of the UAV 100 may all be controlled by controlling speeds of the motors that drive the respective rotors 102 of the UAV 100. During flight, a GPS receiver on the UAV 100 may provide navigational data to the remote controller 112 for use in determining flight paths and displaying current location through the user interface 114. A vision-based navigation system may also be implemented that tracks visually significant features through image data captured by the imaging device 104 to provide the necessary speed and position of the UAV 100 to the remote controller 112.

The communications interface may utilize any wireless interface configuration, e.g., WiFi, Bluetooth (BT), cellular data link, ZigBee, near field communications (NFC) link, e.g., using ISO/IEC 14443 protocol, ANT+ link, and/or other wireless communications link. In some implementations, the communications interface may be effectuated using a wired interface, e.g., HDMI, USB, digital video interface, display port interface (e.g., digital display interface developed by the Video Electronics Standards Association (VESA), Ethernet, Thunderbolt), and/or other interface.

The remote controller 112 may operate a software application (e.g., GoPro Studio®, GoPro App®, and/or other application) configured to perform a variety of operations related to camera configuration, positioning of the movement mechanism 106, control of video acquisition, and/or display of video captured by the imaging device 104 through the user interface 114. An application (e.g., GoPro App®) may enable a user to create short video clips and share video clips to a cloud service (e.g., Instagram®, Facebook®, YouTube®, Dropbox®); perform full remote control of functions of the imaging device 104; live preview video being captured for shot framing; mark key moments while recording (e.g., HiLight Tag®, View HiLight Tags in GoPro Camera Roll®) for location and/or playback of video highlights; wirelessly control camera software; and/or perform other functions. Various methodologies may be utilized for configuring the imaging device 104 and/or displaying the captured information.

Figure 2:
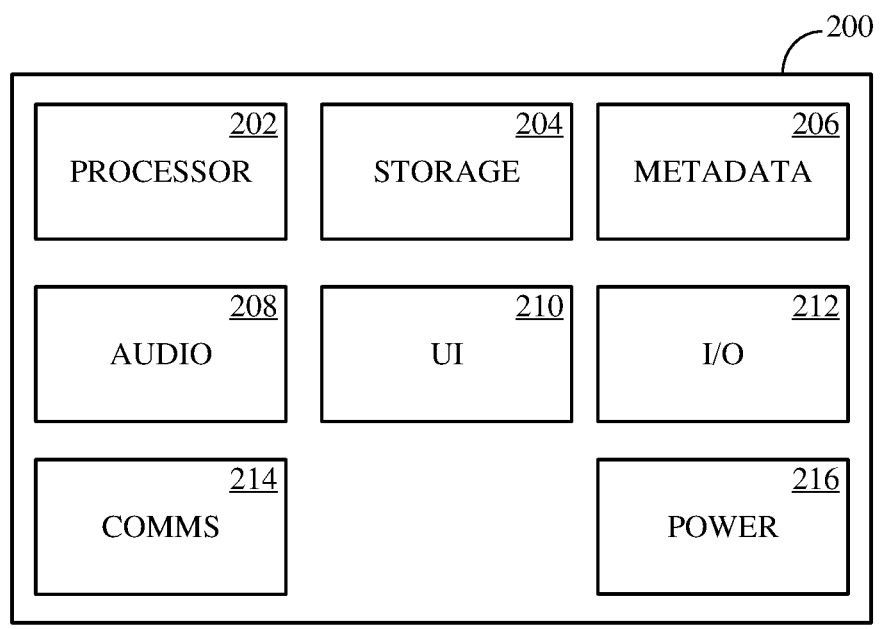
FIG. 2 is a block diagram illustrating components of a computing device.

FIG. 2 is a block diagram illustrating components of a computing device 200. The computing device 200 may be a single component of the UAV 100, the imaging device 104, the movement mechanism 106, or the remote controller 112. The computing device 200 may be multiple computing devices distributed in various ways between the UAV 100, the imaging device 104, the movement mechanism 106, or the remote controller 112. In the examples described, the computing device 200 may provide communication and control functions to the various components described in reference to FIGS. 1A, 1B, and 1C.

The computing device 200 may include a processor 202. The processor 202 may include a system on a chip (SoC), microcontroller, microprocessor, CPU, DSP, ASIC, GPU, or other processors that control the operation and functionality of the UAV 100, the imaging device 104, the movement mechanism 106, and/or the remote controller 112. The processor 202 may interface with mechanical, electrical, sensory, and power modules via driver interfaces and software abstraction layers. Additional processing and memory capacity may be used to support these processes. These components may be fully controlled by the processor 202. In some implementations, one or more components may be operable by one or more other control processes (e.g., a GPS receiver may include a processing apparatus configured to provide position and motion information to the processor 202 in accordance with a given schedule (e.g., values of latitude, longitude, and elevation at 10 Hz.))

The computing device 200 may also include electronic storage 204 in which configuration parameters, image data, and/or code for functional algorithms may be stored. The electronic storage 204 may include a system memory module that is configured to store executable computer instructions that, when executed by the processor 202, control various functions of the UAV 100, the imaging device 104, the movement mechanism 106, and/or the remote controller 112. The electronic storage 204 may also include storage memory configured to store content (e.g., metadata, frames, video, and audio) captured by the imaging device 104 or sensors associated with the UAV 100, the movement mechanism 106, and/or the remote controller 112.

The electronic storage 204 may include non-transitory memory configured to store configuration information and processing code configured to enable video information and metadata capture. The configuration information may include capture type (video, frames), image resolution, frame rate, burst setting, white balance, recording configuration (e.g., loop mode), audio track configuration, and other parameters that may be associated with audio, video, and metadata capture. Additional electronic storage 204 may be available for other hardware, firmware, or software needs of the UAV 100, the imaging device 104, the movement mechanism 106, and/or the remote controller 112. The memory and processing capacity may aid in management of processing configuration (e.g., loading, replacement) operations during a startup and/or other operations.

The computing device 200 may include or be in communication with metadata sources 206. The metadata sources 206 may include sensors associated with the UAV 100, the imaging device 104, and/or the movement mechanism 106. The sensors may include an inertial measurement unit (IMU), an accelerometer, a gyroscope, a barometer, a magnetometer, a compass, a LIDAR sensor, a global positioning satellite (GPS) receiver, an altimeter, an ambient light sensor, a temperature sensor, a pressure sensor, a heart rate sensor, a depth sensor (such as radar, an infra-red-based depth sensor, such as a Kinect-style depth sensor, and a stereo depth sensor), and/or other sensors. The imaging device 104 may also provide metadata sources 206, e.g., image sensors, a battery monitor, storage parameters, and other information related to camera operation and capture of content. The metadata sources 206 may obtain information related to an environment of the UAV 100 and aspects in which the content is captured.

By way of a non-limiting example, an accelerometer may provide motion information including acceleration vectors from which velocity vectors may be derived, and a barometer may provide pressure information from which elevation may be derived. A gyroscope may provide orientation information, a GPS sensor may provide GPS coordinates and time for identifying location, and an altimeter may obtain altitude information. The metadata sources 206 may be rigidly coupled to the UAV 100, the imaging device 104, the movement mechanism 106, and/or the remote controller 112 such that the processor 202 may be operable to synchronize various types of information received from various types of metadata sources 206.

For example, using timing information, metadata information may be related to content (frame or video) captured by an image sensor. In some implementations, the metadata capture may be decoupled from the video or frame capture. That is, metadata may be stored before, after, and in-between one or more video clips or frames. In one or more implementations, the processor 202 may perform operations on the received metadata to generate additional metadata information. For example, the processor 202 may integrate received acceleration information to determine a velocity profile of the imaging device 104 during a recording of a video.

The computing device 200 may include or be in communication with audio sources 208, such as one or more microphones, configured to provide audio information that may be associated with images acquired by the imaging device 104 or commands provided by the remote controller 112. Two or more microphones may be combined to form a microphone system that is directional. Such a directional microphone system can be used to determine the location of a sound source and to eliminate undesirable noise originating in a particular direction. Various audio filters may be applied as well. In some implementations, audio information may be encoded using AAC, AC3, MP3, linear PCM, MPEG-H, and other audio coding formats (audio codec.) In one or more implementations of spherical video and audio, the audio codec may include a 3-dimensional audio codec. For example, an Ambisonics codec can produce full surround audio including a height dimension. Using a G-format Ambionics codec, a special decoder may not be required.

The computing device 200 may include or be in communication with a user interface (UI) 210. The UI 210 may include a display configured to provide information related to operation modes (e.g., camera modes, flight modes), connection status (e.g., connected, wireless, wired), power modes (e.g., standby, sensor, video), metadata sources 206 (e.g., heart rate, GPS, barometric), and/or other information associated with the UAV 100, the imaging device 104, the movement mechanism 106, and/or the remote controller 112. In some implementations, the UI 210 may include virtually any device capable of registering inputs from and communicating outputs to a user. These may include, without limitation, display, touch, gesture, proximity, light, sound receiving/emitting, wired/wireless, and/or other input/output devices. The UI 210 may include a display, one or more tactile elements (e.g., joysticks, switches, buttons, and/or virtual touch screen buttons), lights (e.g., LED, LCD, or the like), speakers, and/or other interface elements.

The UI 210 may be configured to enable the user to provide commands to the UAV 100, the imaging device 104, and/or the movement mechanism 106. For example, the user interface 114 shown in FIG. 1C is one example of the UI 210. User commands provided using the UI 210 may be encoded using a variety of approaches, including but not limited to duration of a button press (pulse-width modulation), number of button presses (pulse code modulation), or a combination thereof. For example, two short button presses through the UI 210 may initiate a sensor acquisition mode. In another example, a single short button press may be used to communicate (i) initiation of video or frame capture and cessation of video or frame capture (toggle mode) or (ii) video or frame capture for a given time duration or number of frames (burst capture). Other user command or communication implementations may also be realized, such as one or more short or long button presses or toggles of a joystick.

The computing device 200 may include an input/output (I/O) module 212. The I/O module 212 may be configured to synchronize the imaging device 104 with the remote controller 112, a second capture device, a smartphone, and/or a video server. The I/O module 212 may be configured to communicate information to and from various I/O components. The I/O module 212 may include a wired or wireless communications interface (e.g., Wi-Fi, Bluetooth, USB, HDMI, Wireless USB, Near Field Communication (NFC), Ethernet, a radio frequency transceiver, and other interfaces) configured to communicate to one or more external devices. The I/O module 212 may interface with LED lights, a display, a button, a microphone, speakers, and other I/O components. In one or more implementations, the I/O module 212 may be coupled to an energy source such as a battery or other DC electrical source.

The computing device 200 may include a communication module 214 coupled to the I/O module 212. The communication module 214 may include a component (e.g., a dongle) having an infrared sensor, a radio frequency transceiver and antenna, an ultrasonic transducer, and/or other communications interfaces used to send and receive wireless communication signals. In some implementations, the communication module 214 may include a local (e.g., Bluetooth, Wi-Fi, or the like) or broad range (e.g., 3G, Long Term Evolution (LTE) or the like) communications interface configured to enable communications between the UAV 100, the imaging device 104, the movement mechanism 106, and/or the remote controller 112.

The communication module 214 may employ communication technologies including one or more of Ethernet, 802.11, worldwide interoperability for microwave access (WiMAX), 3G, LTE, digital subscriber line (DSL), asynchronous transfer mode (ATM), InfiniBand, PCI Express Advanced Switching, and/or other communication technologies. By way of non-limiting example, the communication module 214 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the communication module 214 may be represented using formats including one or more of hypertext markup language (HTML), extensible markup language (XML), and/or other formats. One or more exchanges of information between the imaging device 104 and outside devices, such as the remote controller 112, may be encrypted using encryption technologies including one or more of secure sockets layer (SSL), transport layer security (TLS), virtual private networks (VPNs), Internet Protocol security (IPsec), and/or other encryption technologies.

The computing device 200 may include a power system 216 that may moderate a power supply based on the needs of the UAV 100, the imaging device 104, the movement mechanism 106, and/or the remote controller 112. For example, a battery, solar cell, inductive (contactless) power source, rectification, or other power supply housed within the UAV 100 may be controlled by the power system 216 to supply power for the imaging device 104 and/or the movement mechanism 106 when in a coupled state as shown in FIG. 1A.

Implementations of the computing device 200 may include additional, fewer, or different components than shown in FIG. 2. In some implementations, the computing device 200 may include optics. For example, the optics may include a lens, such as the lens 108 shown in FIG. 1B. The lens may, for example, include a standard lens, macro lens, fisheye lens, zoom lens, special-purpose lens, telephoto lens, prime lens, achromatic lens, apochromatic lens, process lens, wide-angle lens, ultra-wide-angle lens, infrared lens, ultraviolet lens, perspective control lens, or the like.

In some implementations, the computing device 200 may include an image sensor. For example, the image sensor may be a charge-coupled device (CCD) sensor, active pixel sensor (APS), complementary metal-oxide semiconductor (CMOS) sensor, N-type metal-oxide-semiconductor (NMOS) sensor, or the like, or a combination thereof. The image sensor may be configured to capture light waves gathered by optics of the computing device 200 and generate image data based on control signals from a sensor controller. For example, the optics may include focus controller functionality configured to control the operation and configuration of a lens, such as for receiving light from an object and transmitting the received light to the image sensor. The image sensor may use the received light to generate an output signal conveying visual information regarding an object. For example, the visual information may include one or more of an image, a video, and other visual information.

Figure 3:
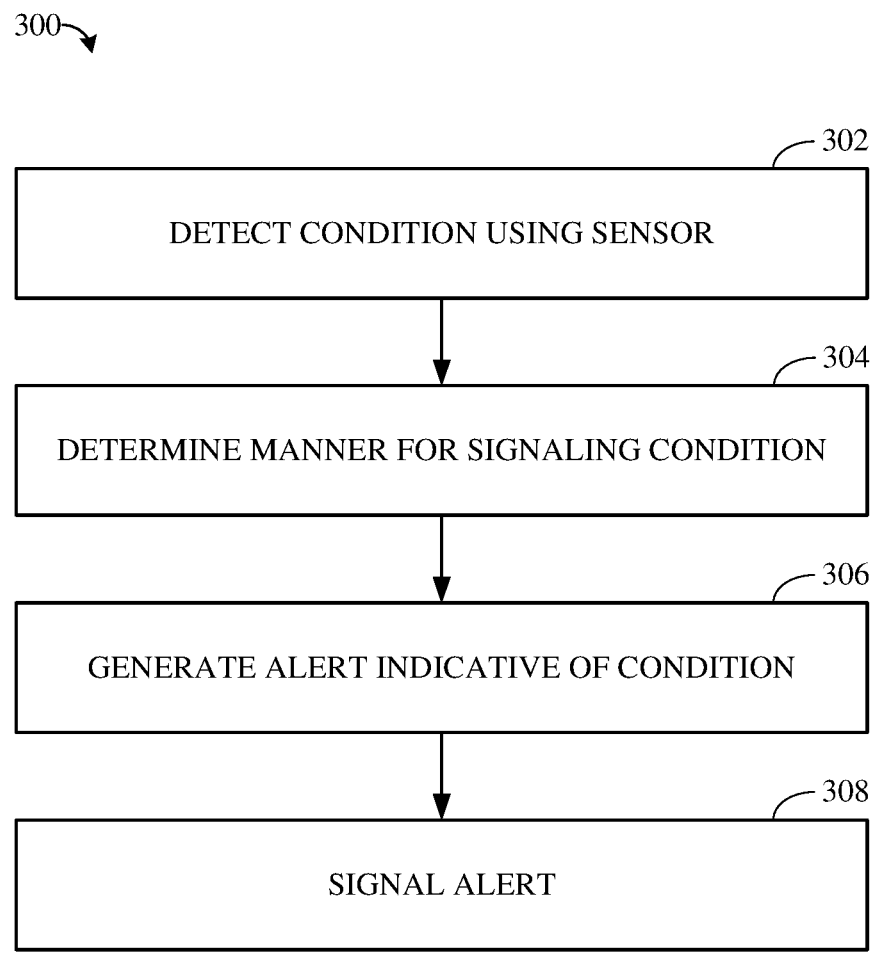
FIG. 3 is a flowchart showing an example of a technique for detecting and signaling a condition of a UAV.

FIG. 3 is a flowchart showing an example of a technique 300 for detecting and signaling a condition of a UAV. The technique 300 can be performed, for example, using hardware and/or software components of a UAV, such as the UAV 100 shown in FIG. 1A. Although the technique 300 is described with respect to a series of operations, the operations comprising the technique 300 may be performed in orders other than those described herein. In some implementations, the technique 300 may include additional, fewer, or different operations than described herein.

At 302, a condition of the UAV is detected using one or more sensors of the UAV. The condition can reflect that the UAV is experiencing an issue requiring attention. For example, the condition can reflect that the UAV has entered a free-fall state, such as because one or more components (e.g., a propeller, motor, electronics, or the like, or a combination thereof) have malfunctioned. In another example, the condition can reflect that the controller of the UAV has lost connection to the UAV. In yet another example, the condition can reflect that the UAV has reached or is approaching a maximum altitude or operating temperature. In still yet another example, the condition can reflect that a power source (e.g., battery) of the UAV is nearly depleted. Other types of conditions may also be detected using the sensors of the UAV.

The sensors the UAV includes to detect the condition can include one or more of an acceleration sensor, a gyroscopic sensor, a temperature sensor, a geolocation sensor, a barometric sensor, or the like. For example, a barometric sensor can indicate an altitude of the UAV. In another example, a temperature sensor, which may be a general sensor within the UAV or a sensor specific to a component or component set within the UAV (e.g., a motor or motor group), can indicate a temperature of the UAV. In yet another example, an acceleration sensor, either alone or in combination with one or both of a gyroscopic sensor or a geolocation sensor, can detect that the UAV has entered a free-fall state.

At 304, a manner for signaling the detected condition is determined. For example, the one or more sensors used to detect the condition can produce data indicative of the condition. The data may, for example, reflect measurements recoded using the sensors that detected the condition, information identifying the sensors that detected the condition, or the like, or a combination thereof. The UAV may include functionality (e.g., contained within a detection mechanism or like hardware or software component) for processing the sensor data to determine how the detected condition should be signaled.

A storage of the UAV may include a database or other data store including alert definitions for how different types of conditions are to be signaled by the UAV. For example, one such alert definition can reflect that the condition of the UAV entering a free-fall state is to be signaled by using the motor of the UAV to produce an audible tone. In another example, another such alert definition can reflect that the condition of the UAV has reached or is approaching a maximum operating temperature can be signaled using a flashing red light on the UAV, the controller, or both. In yet another example, another such alert definition can reflect that the condition of a lost connection between the UAV and the controller can be signaled by the UAV automatically returning to a nearest surface on which it can land.

Determining the manner by which to signal a detected condition can include querying the database or other data store based on data associated with the condition (e.g., using some or all of the sensor data produced based on the condition detection). For example, a Structured Query Language (SQL) or like query can be processed to request a database record where measurement values are provided, sensor type is provided, or the like, or a combination thereof. An alert definition associated with the condition can be identified as a result of the query.

The alert definitions can be set according default configurations of the UAV. For example, the alert definition be configured by a manufacturer of the UAV in preparing the UAV for purchase. In another example, previous configurations of the alert definitions can be updated by a firmware update or like software update for the UAV. Alternatively, a user of the UAV may have permissions to configure or reconfigure the alert definitions. For example, a mobile application enabling an interface with the UAV may permit a user to define conditions to be detected using the sensors of the UAV and the manners by which such conditions are signaled.

At 306, an alert is generated based on the manner by which it was determined to signal the condition. The alert is thus indicative of the condition. Generating the alert can include producing instructions to be processed by a software or hardware component of the UAV to carry out the signaling of the condition according to the corresponding alert definition. For example, the instructions can include instructions to cause a light to flash, to control the UAV to fly in a particular direction, or the like.

At 308, the alert is signaled. The particular manner by which to signal a particular condition is indicated by the alert. For example, the alert can include data or instructions for causing the signaling, indicating the component of the UAV to use for the signaling, or the like. Signaling the alert can include causing instructions produced as described above to be executed or otherwise performed, such as, for example, to flash a light, produce an audible tone, control the UAV in a particular way, communicating data indicative of the condition and/or alert to a different UAV (e.g., UAV to UAV communications, such as using radio signals) such as to cause the UAV receiving the signal to adjust a flight path or other operational aspects (e.g., to avoid collision or other issue with the signaling UAV), or the like, or a combination thereof.

Figure 4:
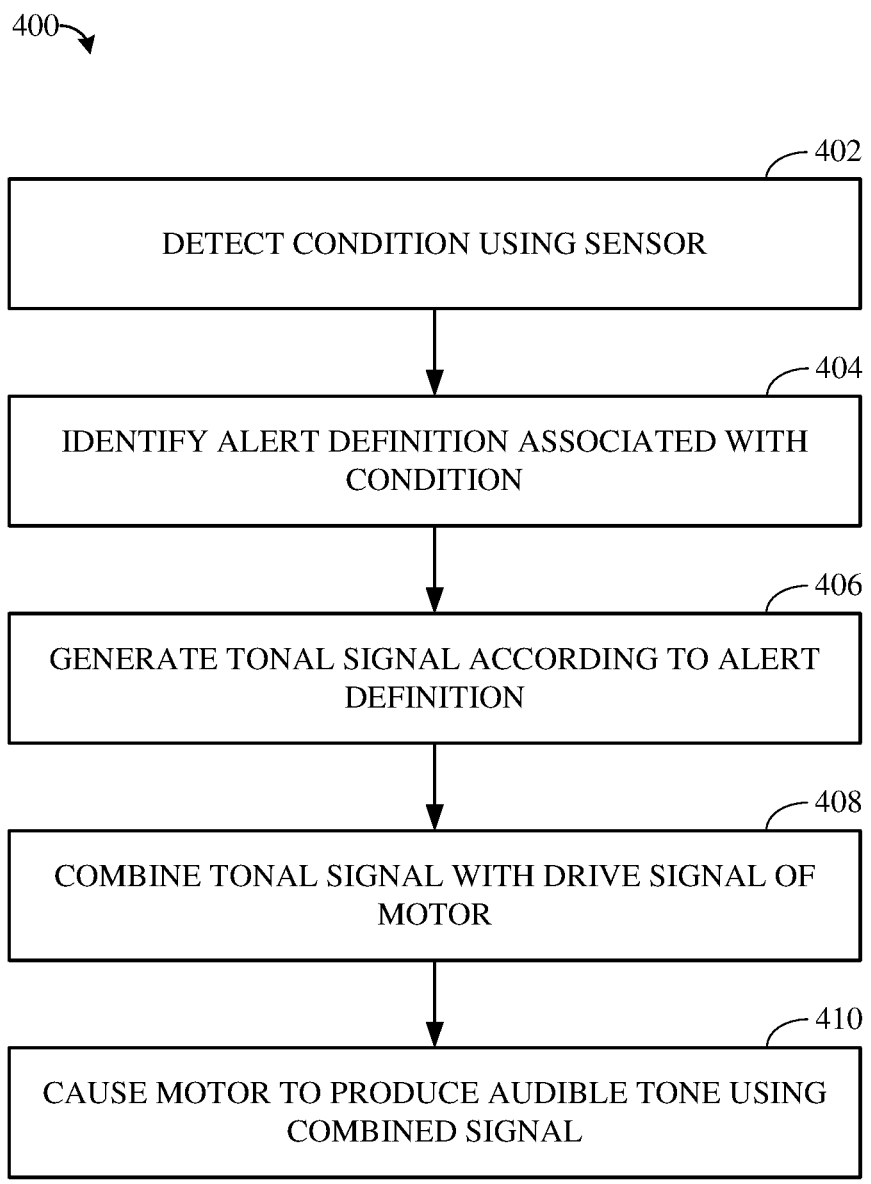
FIG. 4 is a flowchart showing an example of a technique for causing a motor of a UAV to produce an audible tone indicative of a condition of the UAV.

FIG. 4 is a flowchart showing an example of a technique 400 for causing a motor of a UAV to produce an audible tone indicative of a condition of the UAV. The technique 400 can be performed, for example, using hardware and/or software components of a UAV, such as the UAV 100 shown in FIG. 1A. Although the technique 400 is described with respect to a series of operations, the operations comprising the technique 400 may be performed in orders other than those described herein. In some implementations, the technique 400 may include additional, fewer, or different operations than described herein.

The technique 400 may represent an implementation of the technique 300 shown in FIG. 3, for example, where the condition detected using the sensors of the UAV is to be signaled by causing a motor of the UAV to produce an audible tone. Alternatively, the technique 400 can represent a technique separate from the technique 300, such as a technique that is specifically performed to use a motor of a UAV to signal a detected condition by causing the motor to produce an audible tone indicative of the detected condition.

At 402, a condition of the UAV is detected using one or more sensors of the UAV. The condition can be detected as described above with respect to the technique 300 shown in FIG. 3. For example, one or more of the sensors of the UAV can receive input representing measurements about the UAV and produce sensor data based on the input. The sensor data is produced to represent that the condition measured using the sensors has been detected. Examples of sensors usable to detect conditions and conditions detectable by those sensors are described above with respect to the technique 300 in FIG. 3.

At 404, an alert definition associated with the condition is identified. The alert definition indicates a manner by which to signal the detected condition. For example, the alert definition can specify an audible tone for signaling the condition. For example, the alert definition can specify a particular audible tone to be produced to signal the condition or instead indicate that some form of audible tone should be used to signal the condition. Identifying the alert definition can include querying a database based on data indicative of the condition. For example, the database can be locally stored in a memory or storage of the UAV. The database can store records associated with alert definitions. Each record stored in the database may correspond to a different alert definition associated with conditions detectable using the sensors of the UAV. Examples of identifying an alert definition are described above with respect to the technique 300 in FIG. 3.

At 406, a tonal signal is generated according to the alert definition. For example, a component of the UAV may include an amplifier that has unity gain and produces data indicative of an audible tone. The tonal signal has a frequency within an audible spectrum. Generating the tonal signal includes using the alert definition identified based on the detected condition to configure the amplifier to produce amplitudes corresponding to the frequency within the audible spectrum. As will be described below, the tonal signal will subsequently be combined with a drive signal. The frequency of the tonal signal may be distinct from frequencies of the drive signal. For example, the drive signal may use one or more frequencies. The tonal signal may thus be generated by identifying a frequency that is not already used by the drive signal.

At 408, the tonal signal and a drive signal of a motor of the UAV are combined to produce a combined signal. The drive signal is a digital signal used for supplying current to a motor of the unmanned aerial vehicle. For example, the drive signal can be a pulse-width modulation-type signal output from a motor controller of the UAV to supply an amount of current to the motor. An amplitude of the drive signal may modulate according to a rate and/or range defined for the motor of the UAV. In contrast, an amplitude of the tonal signal may modulate according to an amplitude of the drive signal. Combining the tonal signal and the drive signal can include adding the tonal signal on top of the drive signal. Implementations and examples of scaling a tonal signal used to produce an audible tone are described below with respect to FIG. 5.

Figure 5:
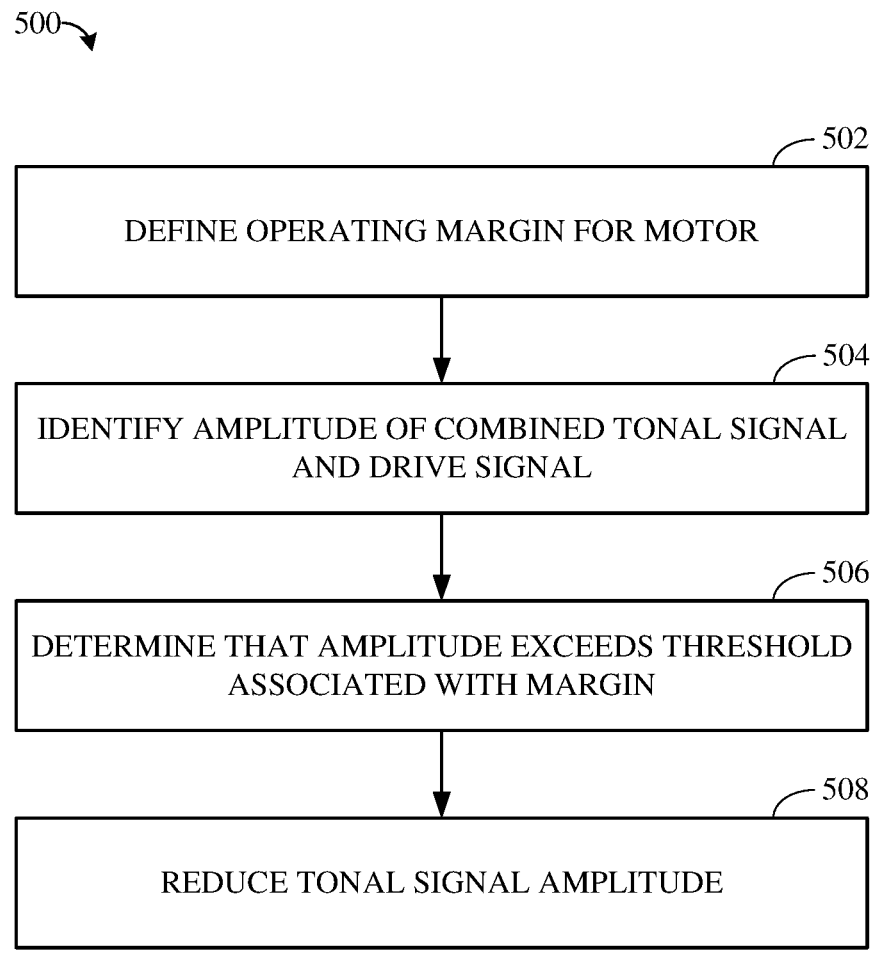
FIG. 5 is a flowchart showing an example of a technique for scaling a tonal signal used to produce an audible tone.

At 410, the motor of the UAV is caused to produce the audible tone using the combined signal. Causing the motor of the UAV to produce the audible tone using the combined signal includes transmitting the combined signal from a motor controller used to produce the combined signal to the motor. The combined signal includes an amplitude corresponding to the frequency of the tonal signal. Transmitting the combined signal to the motor causes the motor to vibrate according to that amplitude. The vibrations create the audible tone, which is then output from the UAV FIG. 5 is a flowchart showing an example of a technique for scaling a tonal signal used to produce an audible tone. The technique 500 can be performed, for example, using hardware and/or software components of a UAV, such as the UAV 100 shown in FIG. 1A. Although the technique 500 is described with respect to a series of operations, the operations comprising the technique 500 may be performed in orders other than those described herein. In some implementations, the technique 500 may include additional, fewer, or different operations than described herein.

The technique 500 may represent an implementation of the technique 400 shown in FIG. 4, for example, describing a subset of the operations of the technique 400 directed towards combining a tonal signal and a drive signal to produce a combined signal. Alternatively, the technique 500 can represent a technique separate from the technique 400, such as a technique that is specifically performed to compare signal amplitude to prevent saturation, such as which may affect the operation of a motor of a UAV.

At 502, an operating margin is defined for the motor of the UAV. The operating margin represents a value margin reserved to prevent issues, for example, from signal amplitudes or operating conditions that exceed a maximum allowable value. An operating margin represents a configurable ceiling for values of a value space, such as by making unavailable from use a certain percentage (e.g., 10, 20, or the like) of values of the value space.

The operating margin may be defined according to default configurations or requirements for operating the UAV. For example, the operating margin may be based on a maximum amount of current that can be supplied to the motor using the drive signal. For example, the operating margin may be defined based on a maximum amount of current that can be supplied to the motor using the drive signal. The maximum amount of current that can be supplied to the motor may, for example, change over time during operation of the unmanned aerial vehicle. In another example, the operating margin may be based on a maximum temperature of the UAV 700 or a portion thereof (e.g., the motor 706) can reach before a risk of damage to the UAV 700 occurs.

At 504, an amplitude of a combined tonal signal and drive signal is identified. The combined tonal signal and drive signal may represent the combined signal described above with respect to the technique 400 shown in FIG. 4. Alternatively, the combined tonal signal and drive signal may represent a signal including the combined amplitudes of the tonal signal and the drive signal, but before such tonal signal and such drive signal are combined. For example, identifying the amplitude of the combined tonal signal and drive signal can include combining an amplitude corresponding to a frequency of the tonal signal and an amplitude corresponding to a frequency of the drive signal.

At 506, a determination is made that the amplitude of the combined tonal signal and drive signal exceeds an amplitude threshold associated with the operating margin defined for the motor. The amplitude threshold may represent a maximum signal amplitude that can be transmitted to the motor without saturation (e.g., without causing the drive signal to saturate). For example, the amplitude threshold may reflect a maximum amount of tonal signal that, when combined with the drive signal, still causes the motor to operate as intended. If an amount of tonal signal above that maximum amount is combined, the total amplitude of the combined tonal signal and drive signal will saturate, causing the drive signal to not be usable to, or to otherwise be less effective for use in, driving the motor.

At 508, the amplitude of the tonal signal is reduced. For example, responsive to determining that the amplitude of the combined tonal signal and drive signal exceeds the amplitude threshold, the amplitude of the tonal signal can be modulated. Modulating the tonal signal can result in the amplitude of the combined tonal signal and drive signal (e.g., and thus the amplitude of the combined signal described above with respect to the technique 400 shown in FIG. 4.) to not exceed the amplitude threshold.

Modulating the amplitude of the tonal signal changes a volume of an audible tone that can be produced using the tonal signal. For example, reducing the amplitude of the tonal signal will result in a reduction to the volume of an audible tone produced by the motor of the UAV using the tonal signal. The amplitude of the tonal signal is modulated (e.g., reduced) instead of the amplitude of the drive signal.

This is because modulating (e.g., reducing) the amplitude of the drive signal may cause less current or other power to be communicated to the motor of the UAV. Doing so could result in operational error of the UAV, such as due to a malfunction of the motor.

In some implementations, the technique 500 can include identifying an amplitude of the drive signal. For example, the amplitude of the drive signal may be compared to the operating margin defined for the motor. If the amplitude of the drive signal alone meets a threshold indicating that most or all of the operating margin would be used by the drive signal alone, the technique 500 may skip the operations for identifying the amplitude of the combined tonal signal and drive signal and/or the operations for determining that the amplitude of the combined tonal signal and drive signal exceeds the amplitude threshold associated with the operating margin.

For example, when the amplitude of the drive signal is approaching or at the amplitude threshold of the operating margin, there may be no room to add the amplitude of a tonal signal. In such an implementation, the tonal signal may not be combined with the drive signal, such as described with respect to the technique 400.

In some implementations, the amplitude threshold may be based on measurements other than amplitudes that could cause drive signal saturation. For example, the amplitude threshold may represent a maximum threshold calculated based on an operating temperature of the motor. For example, a software or hardware component of the UAV could use a current temperature of the motor and a function for calculating temperature increase based on signals transmittable to the motor to determine which signals may cause the operating temperature of the motor to exceed a threshold.

In some implementations, the amplitude threshold may be dynamic. For example, a sliding scale can be used to define a value for the amplitude threshold at a given point in time during operation of the UAV. For example, where the amplitude threshold represents a maximum threshold of the combined tonal signal and drive signal based on an operating temperature of the UAV, the amplitude threshold may be higher during earlier phases of the operation of the UAV (e.g., when the then-current operating temperature of the motor is lower) and lower during later phases of the operation of the UAV (e.g., when the then-current operating temperature of the motor is higher).

In some implementations, the amplitude of the tonal signal can be reduced by a defined amount. For example, responsive to determining that the amplitude threshold is exceeded by the amplitude of the combined tonal signal and drive signal, the amplitude of the tonal signal can be reduced to N (e.g., 50) percent of its then-current value. For example, instead of determining a new amplitude value for the tonal signal that, when combined with the amplitude of the drive signal, does not cause the amplitude threshold to be exceeded, a defined amount of the amplitude of the tonal signal can be reduced.

In some implementations, the technique 500 can include determining that the motor is at rest. For example, when the motor is not at rest (e.g., such that the UAV is currently flying), the technique 500 can be performed as described above. However, when the motor is at rest, the technique 500 can omit the operations described above and instead combine the tonal signal and the drive signal by adding the amplitude of the tonal signal on top of the amplitude of the drive signal without further processing.

Figure 6:
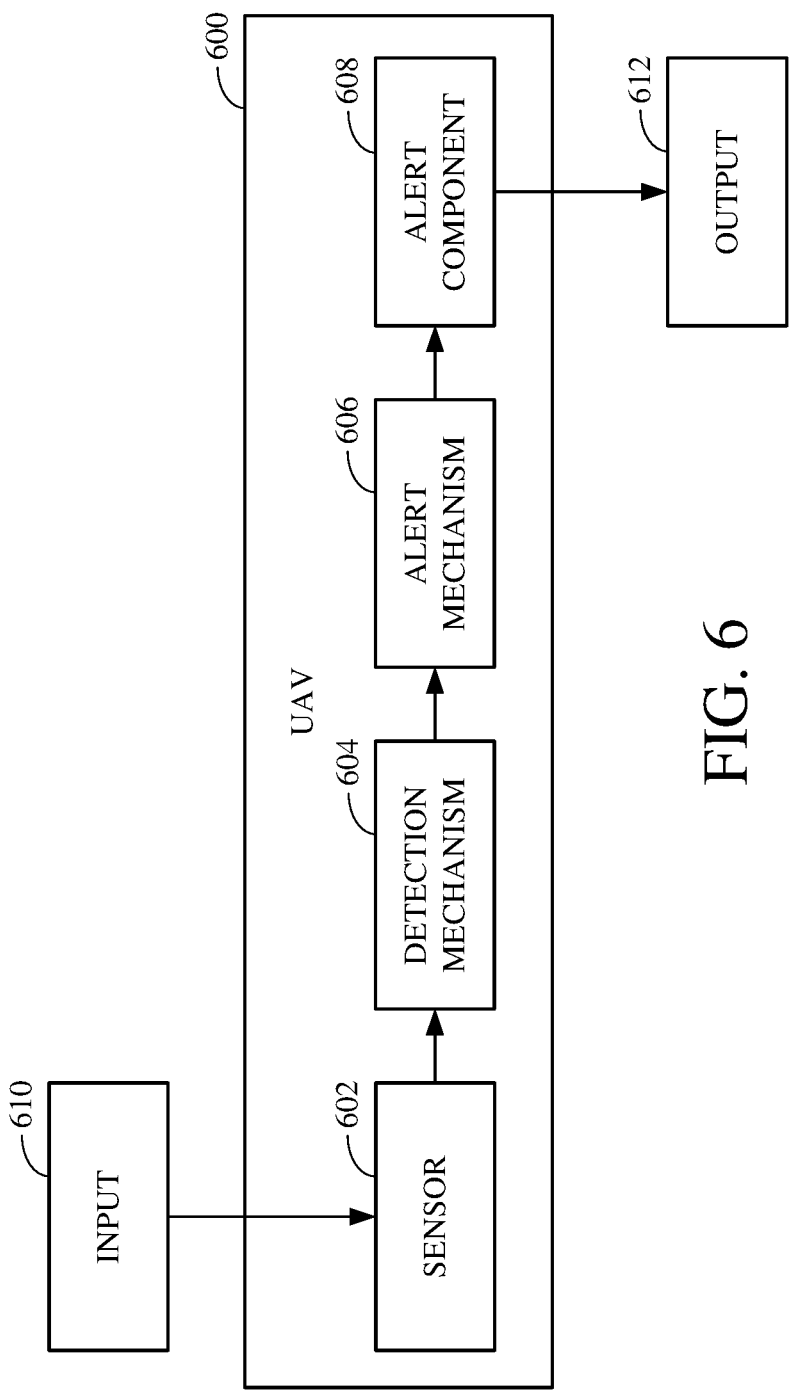
FIG. 6 is a block diagram illustrating an example of components used to detect and signal a condition of a UAV.

FIG. 6 is a block diagram illustrating an example of components used to detect and signal a condition of a UAV 600. The UAV 600 may, for example, be the UAV 100 shown in FIG. 1A. The components of the UAV 600 may, for example, be used to perform some or all of the operations described above with respect to the technique 300 shown in FIG. 3.

The components of the UAV 600 include sensors 602, a detection mechanism 604, an alert mechanism 606, and an alert component 608. The components of the UAV 600 are used to detect a condition of the UAV 600 based on input 610 and signal the detected condition using output 612. The input 610 represents information, measurements, or the like usable by the sensors 602 to produce sensor data, such as to detect the condition. The output 612 represents a signal output by the UAV 600 based on the detected condition.

The sensors 602 include one or more sensors usable to produce sensor data based on input 610. For example, the sensors 602 can include one or more of an acceleration sensor, a gyroscopic sensor, a temperature sensor, a geolocation sensor, a barometric sensor, or the like. The sensors 602 measure the input 610 to produce sensor data, thereby detecting a condition of the UAV 600.

The detection mechanism 604 processes the sensor data produced based on the input 610 to determine a manner by which to signal the detected condition represented by the sensor data. For example, the detection mechanism 604 can include a database, or otherwise include functionality for querying a database, which stores alert definitions indicating manners by which to signal different detectable conditions.

For example, an alert definition corresponding to a low battery can indicate to signal the low battery by flashing an LED light on a controller of the UAV 600. In another example, an alert definition corresponding to the UAV 600 entering a free-fall state can indicate to signal such entry by causing a motor of the UAV 600 to produce an audible tone. Other examples are available. The alert definitions may reflect default configurations for the UAV 600, configured definitions made by users of the UAV 600, or both.

The alert mechanism 606 processes the alert definition identified using the detection mechanism 604 to generate an alert. The alert may reflect instructions for causing the alert component 608 to produce the output 612, information indicating the alert component 608 to use to produce the output 612, or the like, or a combination thereof. The alert component 608 represents one or more hardware or software components of the UAV 600 usable to produce or otherwise cause the output 612. For example, the alert component 608 can be an LED light, the motor, or another component.

Figure 7:
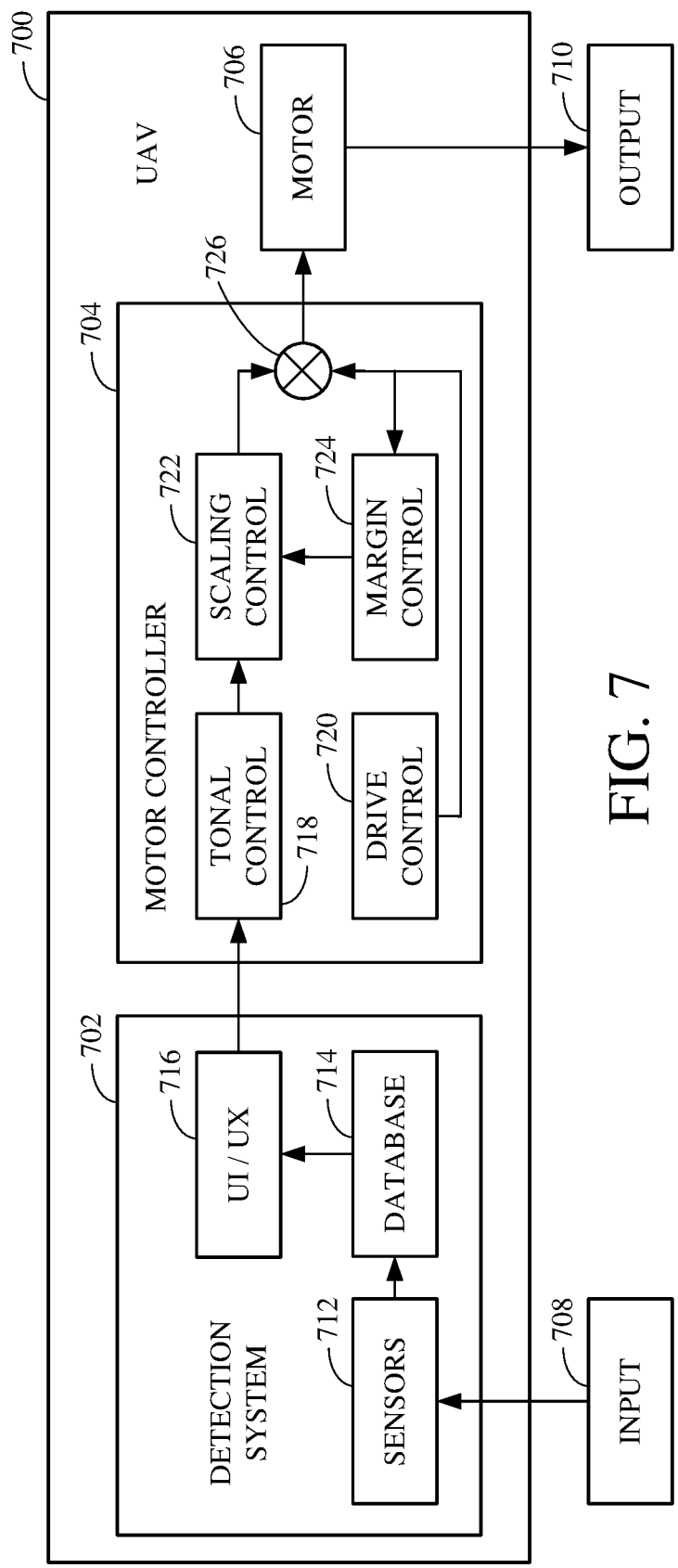
FIG. 7 is a block diagram illustrating an example of components used to cause a motor of a UAV to produce an audible tone indicative of a condition of the UAV.

FIG. 7 is a block diagram illustrating an example of components used to cause a motor of a UAV 700 to produce an audible tone indicative of a condition of the UAV 700. The UAV 700 may, for example, be the UAV 600 shown in FIG. 6. The components of the UAV 700 may, for example, be used to perform some or all of the operations described above with respect to one or both of the technique 400 shown in FIG. 4 or the technique 500 shown in FIG. 5.

The UAV 700 includes a detection system 702, a motor controller 704, and a motor 706, which may, for example, respectively be the detection mechanism 604, the alert mechanism 606, and the alert component 608 shown in FIG. 6. The UAV 700 processes input 708 usable to detect a condition of the UAV 700 to produce output 710 usable to signal the condition. The input 708 and the output 710 may, for example, respectively be the input 610 and the output 612 shown in FIG. 6. For example, the input 708 can reflect information indicating that the UAV 700 has entered a free-fall state, and the output 710 can be an audible tone produced using the motor 706 to signal that the UAV 700 has entered the free-fall state.

The detection system 702 includes the sensors 712, a database 714, and a UI/UX 716. The sensors 712 may, for example, be the sensors 602 shown in FIG. 6. Based on the sensor data produced using the sensors 712, the database 714 is queried for an alert definition indicating a manner by which to signal a condition represented by the produced sensor data. For example, the database 714 can store alert definitions corresponding to multiple types of detectable conditions. The alert definition can, for example, indicate or otherwise specify to cause the motor 706 to produce an audible tone to signal the detected condition that the UAV 700 has entered a free-fall state.

The UI/UX 716 represents an interface between the detection system 702 and the motor controller 704. In particular, the UI/UX 716 is configured to communicate data for use by a tonal control mechanism 718 of the motor controller 704 (described below), such as to cause or otherwise permit the tonal control mechanism 718 to use data from the detection system 702 to generate a tonal signal. The UI/UX 716 pushes data produced using the sensors 712 and/or data retrieved from the database 714 to the motor controller 704 such as to generate the tonal signal using to signal the condition reflected by the input 708. The UI/UX 716 may be an analog interface or a digital interface.

The motor controller 704 includes the tonal control mechanism 718, a drive control mechanism 720, a scaling control mechanism 722, a margin control mechanism 724, and a signal mixer 726. The tonal control mechanism 718 generates a tonal signal subsequent to receiving data associated with a detected condition from the detection system 702 (e.g., using the UI/UX 716). For example, the tonal control mechanism 718 may include an amplifier that has unity gain and produces data indicative of an audible tone (e.g., signal amplitude corresponding to a frequency within an audible spectrum).

The drive control mechanism 720 produces a drive signal used to drive the motor 706. The drive signal may, for example, be a pulse-width modulation-type signal output from a motor controller of the UAV 700 to the motor 706 to supply an amount of current for powering the motor 706. The drive control mechanism 720 may thus include one or more hardware or software components usable to determine and produce such amount of current within a signal-based form. The drive control mechanism 720 may, for example, be configured to produce the drive signal based on fixed rates or ranges by which current or like values to be transmitted to the motor 706 are permitted to change.

The scaling control mechanism 722 compares the combination of an amplitude corresponding to a frequency of the tonal signal and an amplitude corresponding to a frequency of the drive signal to an amplitude threshold. Based on the comparison, the scaling control mechanism 722 modulates one or both of the tonal signal or the drive signal to cause the combined amplitudes of the tonal signal and of the drive signal to not exceed the amplitude threshold. For example, the scaling control mechanism 722 can reduce the amplitude of the tonal signal based on the amplitudes of the tonal signal and of the drive signal.

The margin control mechanism 724 indicates controls the operating margin used by the scaling control mechanism 722 to compare the tonal signal and the drive signal. The margin control mechanism 724 may including functionality for defining the operating margin, such as according to default configurations or requirements for operating the UAV 700.

The signal mixer 726 produces a combined signal by combining the tonal signal generated using the tonal control mechanism 718 and the drive signal generated using the drive control mechanism 720. The signal mixer 726 can receive the tonal signal directly from the tonal control mechanism 718 and the drive signal directly from the drive control mechanism 720. Alternatively, the signal mixer 726 can receive the drive signal directly from the drive control mechanism 720 and the tonal signal indirectly, such as from the scaling control mechanism 722. For example, when an amplitude of the tonal signal is reduced or otherwise modulated, the scaling control mechanism 722 can pass the tonal signal to the signal mixer 726.

The motor 706 receives the combined signal produced using the motor controller 704 (e.g., using the signal mixer 726). The motor 706 uses the combined signal to produce an audible tone as the output 710. For example, the audible tone can represent a sound of an audible spectrum that is produced based on an amplitude of the tonal signal within the combined signal. The motor 706, subsequent to receiving the combined signal, is caused to vibrate according to the amplitude of the tonal signal to produce audible tone as the output 710.

In some implementations, the UAV 700 can omit one or both of the scaling control mechanism 722 or the margin control mechanism 724. For example, where the margin control mechanism 724 is omitted, the scaling control mechanism 722 may include functionality for defining or otherwise maintaining the operating margin used by the scaling control mechanism 722 for comparing a combined amplitude to an amplitude threshold.

In another example, where the scaling control mechanism 722 and the margin control mechanism 724 are both omitted, an operating margin can be built into the motor 706. The motor 706 can process a combined signal received from the motor controller 704 against a static operating margin or a dynamic operating margin (e.g., which may scale over time during operation of the UAV 700). For example, if the combined signal violates the operating margin (e.g., because the combined signal exceeds an amplitude threshold associated with the operating margin), the motor 706 may not produce an audible tone using the combined signal.

In some implementations, the tonal control mechanism 718 can pull data from the UI/UX 716. For example, rather than the UI/UX 716 pushing data from the sensors 712 and/or the database 714, the tonal control mechanism 718 can transmit a request for data to the UI/UX 716. If new data is available (e.g., based on production using the sensors 712 and/or querying from the database 714), the UI/UX may transmit such new data from the detection system 702 to the motor controller 704, such as for use by the tonal control mechanism 718. For example, such requests may be transmitted from the tonal control mechanism 718 on a defined interval basis.

Where certain elements of these implementations may be partially or fully implemented using known components, only those portions of such known components that are necessary for an understanding of this disclosure have been described. Detailed descriptions of other portions of such known components have been omitted so as not to obscure the disclosure.

An implementation showing a singular component in this disclosure should not be considered limiting; rather, this disclosure is intended to encompass other implementations including a plurality of the same component, and vice-versa, unless explicitly stated otherwise herein. Further, this disclosure encompasses present and future known equivalents to the components referred to herein by way of illustration.

As used herein, the term "bus" is meant generally to denote all types of interconnection or communication architecture that may be used to communicate data between two or more entities. The "bus" could be optical, wireless, infrared or another type of communication medium. The exact topology of the bus could be for example standard "bus," hierarchical bus, network-on-chip, address-event-representation (AER) connection, or other type of communication topology used for accessing, e.g., different memories in a system.

As used herein, the term "computing device" is meant to include personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or machine cognizable steps which perform a function. Such program may be rendered in virtually any programming language or environment including, for example, C/C++, C #, Fortran, COBOL, MATLAB™, PASCAL, Python, assembly language, markup languages (e.g., HTML, SGML, XML, VoXML), as well as object-oriented environments such as the Common Object Request Broker Architecture (CORBA), Java™ (including J2ME, Java Beans), Binary Runtime Environment (e.g., BREW).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (FPGAs), programmable logic devices (PLDs), reconfigurable computer fabrics (RCFs), SoCs, application-specific integrated circuits (ASICs), and/or other types of integrated circuits.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor," "microprocessor," and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., FPGAs), PLDs, RCFs, array processors, secure microprocessors, ASICs, and/or other digital processing devices. Such digital processors may be contained on a single unitary IC die, or distributed across multiple components.

As used herein, the terms "network interface" and "communications interface" refer to any signal, data, and/or software interface with a component, network, and/or process. By way of non-limiting example, a communications interface may include one or more of FireWire (e.g., FW400, FW110, and/or other variation.), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other communications interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the terms "imaging device" and "camera" may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the implementations described herein are in terms of a specific sequence of steps of a method, these descriptions are only illustrative of the broader methods of the disclosure and may be modified as required by the particular applications thereof. Certain steps may be rendered unnecessary or optional under certain circumstances. Additionally, certain steps or functionality may be added to the disclosed implementations, or the order of performance of two or more steps permuted. All such variations are considered to be encompassed within the disclosure.

While the above detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technologies.

What is claimed is:

1. A method for detecting and signaling a condition of an unmanned aerial vehicle, the method comprising:

detecting the condition using one or more sensors of the unmanned aerial vehicle;

identifying an alert definition associated with the condition, the alert definition specifying an audible tone for signaling the condition;

generating an alert according to the alert definition, the alert including a tonal signal having a frequency within an audible spectrum;

combining the tonal signal and a drive signal to produce a combined signal, the drive signal supplying current to a motor of the unmanned aerial vehicle; and signaling the condition by causing the motor to produce the audible tone using the combined signal.

2. The method of claim 1, wherein identifying the alert definition associated with the condition comprises:
   querying a database based on data indicative of the condition, the database storing records associated with a plurality of alert definitions including the alert definition.

3. The method of claim 1, wherein combining the tonal signal with the drive signal to produce the combined signal comprises:
   combining a first amplitude corresponding to the frequency of the tonal signal and a second amplitude corresponding to a frequency of the drive signal to produce a combined amplitude;
   determining that the combined amplitude exceeds an amplitude threshold, the amplitude threshold associated with an operating margin defined for the motor; and
   responsive to determining that the combined amplitude exceeds the amplitude threshold, modulating the first amplitude to cause the combined amplitude to not exceed the amplitude threshold.

4. The method of claim 3, further comprising:
   defining the operating margin based on a maximum amount of current that can be supplied to the motor using the drive signal.

5. The method of claim 4, wherein the maximum amount of current that can be supplied to the motor changes over time during operation of the unmanned aerial vehicle.

6. The method of claim 3, wherein the amplitude threshold represents a maximum signal amplitude that can be transmitted to the motor without saturation.

7. The method of claim 1, wherein the combined signal includes an amplitude corresponding to the frequency of the tonal signal, and wherein causing the motor to produce the audible tone according to the combined signal comprises:
   transmitting the combined signal from a motor controller to the motor; and
   causing the motor to vibrate according to the amplitude.

8. The method of claim 1, wherein the condition reflects the unmanned aerial vehicle entering a free-fall state.

9. The method of claim 1, wherein the frequency of the tonal signal is distinct from frequencies of the drive signal.

10. An unmanned aerial vehicle, comprising:
    a detection system including one or more sensors for detecting a condition of the unmanned aerial vehicle;
    a motor controller including a tonal control mechanism and a signal mixer, wherein the tonal control mechanism generates a tonal signal subsequent to receiving data associated with the condition from the detection system, and wherein the signal mixer produces a combined signal by combining the tonal signal and a drive signal; and
    a motor that produces an audible tone using the combined signal subsequent to receiving the combined signal from the motor controller.

11. The unmanned aerial vehicle of claim 10, wherein the detection system includes a database for storing an alert definition indicating to signal the condition by producing the audible tone, wherein the database is queried based on data indicative of the condition to identify the alert definition.

12. The unmanned aerial vehicle of claim 10, wherein the motor controller includes a scaling control mechanism that:
    combines a first amplitude corresponding to a frequency of the tonal signal and a second amplitude corresponding to a frequency of the drive signal to produce a combined amplitude;
    determines that the combined amplitude exceeds an amplitude threshold, the amplitude threshold associated with an operating margin defined for the motor; and
    responsive to determining that the combined amplitude exceeds the amplitude threshold, modulates the first amplitude to cause the combined amplitude to not exceed the amplitude threshold.

13. The unmanned aerial vehicle of claim 12, wherein the motor controller includes a margin control mechanism that indicates the operating margin based on a maximum amount of current that can be supplied to the motor using the drive signal.

14. The unmanned aerial vehicle of claim 13, wherein the maximum amount of current that can be supplied to the motor changes over time during operation of the unmanned aerial vehicle.

15. A non-transitory computer-readable storage medium, comprising processor-executable routines that, when executed by a processor, facilitate a performance of operations at an unmanned aerial vehicle, the operations comprising:
    combining a first amplitude corresponding to a frequency of a tonal signal and a second amplitude corresponding to a frequency of a drive signal to produce a combined amplitude;
    determining that the combined amplitude exceeds an amplitude threshold;
    responsive to determining that the combined amplitude exceeds the amplitude threshold, reducing the first amplitude;
    subsequent to reducing the first amplitude, combining the tonal signal and the drive signal to produce a combined signal; and
    causing a motor of the unmanned aerial vehicle to produce an audible tone using the combined signal.

16. The non-transitory computer-readable storage medium of claim 15, wherein the audible tone is indicative of a condition of the unmanned aerial vehicle, the operation further comprising:
    detecting the condition using one or more sensors of the unmanned aerial vehicle.

17. The non-transitory computer-readable storage medium of claim 16, further comprising:
    identifying an alert definition associated with the condition, the alert definition indicating to signal the condition by producing the audible tone.

18. The non-transitory computer-readable storage medium of claim 17, wherein the operations for identifying an alert definition associated with the condition comprise:
    querying a database for a record associated with the condition, the record corresponding to the alert definition.

19. The non-transitory computer-readable storage medium of claim 17, further comprising:
    generating the tonal signal according to the alert definition, wherein the frequency of the tonal signal is within an audible spectrum.

20. The non-transitory computer-readable storage medium of claim 15, wherein the operations for causing the motor of the unmanned aerial vehicle to produce the audible tone using the combined signal comprise:

transmitting the combined signal to the motor, wherein the motor, subsequent to receiving the combined signal, vibrates according to the first amplitude.

\* \* \* \* \*